(12) United States Patent
Laurent

(10) Patent No.: US 9,511,340 B2
(45) Date of Patent: Dec. 6, 2016

(54) HANDLEABLE CALCO-MAGNESIAN SUSPENSION

(71) Applicant: S. A. Lhoist Recherche et Developpement, Ottignies-Louvain-la-Neuve (BE)

(72) Inventor: Bernard Laurent, Lustin (BE)

(73) Assignee: S.A. Lhoist Recherche et Developpement, Ottihnies-Louvain-la (BE)

( * ) Notice: Subject to any disclaimer, the term of this patent is extended or adjusted under 35 U.S.C. 154(b) by 0 days.

(21) Appl. No.: 14/436,944

(22) PCT Filed: Oct. 25, 2013

(86) PCT No.: PCT/EP2013/072350
§ 371 (c)(1),
(2) Date: Apr. 20, 2015

(87) PCT Pub. No.: WO2014/064234
PCT Pub. Date: May 1, 2014

(65) Prior Publication Data
US 2015/0258519 A1    Sep. 17, 2015

Related U.S. Application Data

(60) Provisional application No. 61/756,091, filed on Jan. 24, 2013.

(30) Foreign Application Priority Data

Oct. 25, 2012 (BE) .................................. 2012/0719

(51) Int. Cl.
C01F 5/14 (2006.01)
B01J 13/00 (2006.01)
B01F 17/00 (2006.01)

(52) U.S. Cl.
CPC ........ *B01J 13/0086* (2013.01); *B01F 17/0007* (2013.01); *B01F 17/0064* (2013.01)

(58) Field of Classification Search
CPC ............ C01F 5/00; C01F 5/14; C01F 11/00; C01F 11/02; B01J 13/0086
See application file for complete search history.

(56) References Cited

U.S. PATENT DOCUMENTS

| 4,375,526 A | 3/1983 | Zupanovich et al. |
| 5,311,925 A * | 5/1994 | Waltman ............ B22D 11/1245 164/477 |
| 6,867,165 B2 * | 3/2005 | Chin ...................... B01D 53/02 502/208 |
| 2004/0023824 A1 * | 2/2004 | Zuechner ............... B82Y 30/00 510/276 |

FOREIGN PATENT DOCUMENTS

| EP | 061354 B1 | 9/1982 |
| EP | 592169 B1 | 4/1994 |
| EP | 594332 B1 | 4/1994 |
| WO | 2006/060667 A1 | 5/2006 |

OTHER PUBLICATIONS

PCT/EP2013/072350, European Patent Office, International Search Report, Feb. 4, 2014, 3 pages.

* cited by examiner

*Primary Examiner* — Anthony J Green
(74) *Attorney, Agent, or Firm* — Whitaker Chalk Swindle & Schwartz PLLC; Charles D. Gunter, Jr.

(57) ABSTRACT

An aqueous calco-magnesian suspension comprising solid particles fitting the general formula a Ca(OH)$_2$.b Mg(OH)$_2$.c MgO in an aqueous phase at a concentration greater than or equal to 200 g/kg, wherein a, b and c represent mass fractions, the sum of which has a value from 90 to 100% and an additive which is simultaneously a viscosity reducer and a viscosity increase moderator, wherein said additive is a phosphonate or a phosphonic acid.

25 Claims, No Drawings

HANDLEABLE CALCO-MAGNESIAN SUSPENSION

The present invention relates to an aqueous calco-magnesian suspension, comprising solid particles fitting the general formula a Ca(OH)$_2$.b Mg(OH)$_2$.c MgO in an aqueous phase at a concentration greater than or equal to 200 g/kg, wherein a, b and c represent mass fractions, the sum of which has a value from 90 to 100%, and an additive which is simultaneously a viscosity reducer and an viscosity increase moderator.

For many years, diverse attempts have been applied for reducing the amount of water used in aqueous calco-magnesian suspensions by means of dispersants.

In the sense of the present invention, by the terms of « aqueous calco-magnesian suspensions », is meant a suspension of solid particles fitting the general formula a Ca(OH)$_2$.b Mg(OH)$_2$.c MgO in an aqueous phase at a concentration greater than or equal to 200 g/kg, wherein a, b and c represent mass fractions, the sum of which has a value from 90 to 100%. The particles further contain from 0 to 10% as a mass fraction of material which may of course contain impurities, i.e. phases derived from SiO$_2$, Al$_2$O$_3$, Fe$_2$O$_3$, MnO, P$_2$O$_5$ and/or SO$_3$, representing overall a few tens of grams per kilogram. These solid particles may also contain as a material calcium oxide which would not have been hydrated during slaking as well as calcium carbonate CaCO$_3$ and/or magnesium carbonate MgCO$_3$, optionally combined in the form of dolomite. Lime milks will therefore form a particular case of application when this is a suspension of slaked lime, i.e., a particular case of the general formula, where the contents of Mg(OH)$_2$ or MgO are low and considered as impurities. The general formula above may also be indicated as a Ca(OH)$_2$.b Mg(OH)$_2$.c MgO.d I (wherein d has a value from 0 to 10% as a mass fraction, I representing impurities).

An aqueous calco-magnesian suspension of this type may be obtained by slaking quick lime, dolomitic quick lime, quick dolime or a mixture of the latter with a much greater amount of water than the stoichiometric amount of water, i.e. than the one required for obtaining powdery slaked (calcic or dolomitic) limes or limes or by mixing solid particles fitting the general formula a Ca(OH)$_2$.b Mg(OH)$_2$.c MgO in an aqueous phase, wherein a, b and c represent mass fractions, the sum of which has a value from 90 to 100%.

Various parameters currently used give the possibility of characterizing aqueous calco-magnesian suspensions, the main being viscosity, solid particle content, grain size of these particles and reactivity of the solid particles (i.e. the dissolution rate).

Viscosity is a determining property as to application and handling (pumping, conveyance in a conduit, . . . ) of the suspension. For this purpose, experience gave the possibility of establishing that the dynamic viscosity of the suspension should be less than 2,000 mPa·s (U.S. Pat. No. 5,616,283) and that it is desirable to not exceed a dynamic viscosity of 1,500 mPa·s (WO 2007110401).

Generally, viscosity increases when the solid material concentration increases and when the size of the suspended particles decreases.

The reactivity of an aqueous calco-magnesian suspensions is determined by the dissolution rates of the particles. It may be measured by injecting a small amount of the suspension in a large volume of demineralized water. This measurement, based on the recording of the time-dependent change in the conductivity of the resulting liquid phase, was developed for monitoring reactivity of lime milks intended for softening of drinking waters (v. Van Eckeren et al. Improved milk-of-lime for softening of drinking water: the answer to the carry-over problem, in Aqua, 1994, 43 (1), p. 1-10). More details on the procedure for measuring this reactivity of lime milks are available in §6.11. « Determination of solubility index by conductivity » of the standard EN 12485: 2010.

The reactivity of an aqueous calco-magnesian suspension is also determining for any neutralization or precipitation operation.

It is known that the solubilization rate of solid particles of an aqueous calco-magnesian suspension is all the faster since the size of the particles is small. Further, great fineness of the particles generally reduces sedimentation of the solid phase of the suspension.

Generally, it is economically advantageous to be able to increase the concentration of the lime milk in order to reduce the transport costs and the size of the equipment (storage tanks, pumps . . . ).

The difficulty of reconciling low viscosity, high concentration and reduction in the size of the particles in suspension is understood.

Unfortunately, even if an aqueous calco-magnesian suspension at a given instant has a dynamic viscosity of less than 1,500 mPa·s, the fact remains that the viscosity of such suspensions is known for not being stable and therefore increasing over time, which represents a major drawback for the uses from the moment that their stirring becomes a problem, and that they are difficult to convey since they do not remain pumpable and therefore risk blocking and damaging the storage and transport equipment.

In order to solve these stability problems, the literature gives information for example on concentrated aqueous calco-magnesian suspensions, to which an additive is added or for which the solid particles have been specifically selected.

It is known how to improve the concentration of lime milk by adding a dispersant agent, in the presence of a small amount of an alkaline metal hydroxide [U.S. Pat. No. 5,616,283]. This preparation method gives the possibility of obtaining concentrations of more than 40% in dry material, with a dynamic viscosity of less than 2,000 or even 1,000 mPa·s. However, the use of dispersants is expensive and incompatible with certain applications.

Increasing the solid phase concentration in the suspension is also known, while limiting increase in viscosity by incorporating slaked lime having a coarser particle size or by slaking quick lime under conditions promoting grain growth, for example by limiting the increase in temperature during slaking, by adding additives such as sulfates, etc. [BE-1006655, U.S. Pat. No. 4,464,353]. Such lime milks are less reactive, which limits the uses thereof. Moreover, these suspensions settle more rapidly, if no dispersant is added.

An aqueous suspension based on lime or on a lime compound with controlled, preferably low, viscosity is also known from document EP 1 663 869, in order to be able to increase the solid material concentration and/or reduce the size of the particles in suspension, which has solid material particles having, before their being suspended, a specific surface area, determined according to the BET method, which is less than or equal to 10 m$^2$/g.

Other families of dispersants have been described, such as derivatives of soluble polysaccharides, of polyacrylates, of polyamines and of polymers of the diallyl ammonium chloride type (U.S. Pat. No. 4,849,128, U.S. Pat. No. 4,610,801).

Other dispersant polymers are also known from documents EP 594 332, EP 592 169 or further U.S. Pat. No. 4,375,526.

More particularly, document WO2007110401 discloses the possibility of stabilizing lime milks by maintaining over time, flow characteristics, (such as dynamic viscosity, field stress or plastic viscosity) at levels compatible with their use, their application, their optimum handling over time. According to the teaching of this document, this result is reached by adding one or several additives selected from carbohydrates or certain of their derivatives, like those obtained by oxidization of these carbohydrates or by hydrogenation of these carbohydrates.

The additives described in this document are more particularly monosaccharides, disaccharides, oligosaccharides and polysaccharides.

Aqueous suspensions of slaked lime with low viscosity, stable during the storage period are also known from document WO2006050567, by combination of a dispersant based on glucose and on a polycarboxylate.

Unfortunately, these teachings, either require a combination of additives or a specific lime, or resort to additives in a large amount and/or incompatible with certain applications of lime milks, or the latter do not have the expected stability of the viscosity during a sufficiently long period (one to several days).

In order to solve this problem, according to the present invention, an aqueous calco-magnesian suspension as mentioned is provided according to the present invention which initially therefore comprises an additive which is simultaneously a reducer of viscosity and an agent for moderating increase in viscosity, i.e. an additive which gives the possibility of obtaining during making, an acceptable viscosity of less than 1,500 mPa·s, preferably less than 1,200 mPa·s and which will give the possibility of slowing down its increase during the period for storing the aqueous calco-magnesian suspension and while involving a reduced content of additive, which simultaneously is a viscosity reducer and a viscosity increase moderator.

For this purpose, the aqueous calco-magnesian suspension according to the present invention is characterized in that said additive is a phosphonate or a phosphonic acid selected from organophosphonic acids, either containing nitrogen or not, or salts thereof, more particularly from the group consisting of aminoalkylene polyphosphonic acids, wherein the alkylene radical contains from 1 to 20 carbon atoms, of hydroxyalkylidene polyphosphonic acids, wherein the alkylidene radical contains from 2 to 50 carbon atoms, phosphono-alkanepolycarboxylic acids, wherein the alkane group contains from 3 to 12 carbon atoms and wherein the molar ratio of the alkylphosphonic acid radical to the carboxylic acid radical is in the range from 1:2 to 1:4, derivatives thereof, such as salts thereof, and mixtures thereof.

The aqueous calco-magnesian suspension according to the present invention therefore gives the possibility of obtaining higher concentrations of solid particles than those which may be obtained with a conventional method while maintaining viscosity at an acceptable value in order to thereby obtain a lime milk which is easier to handle and to store. The aqueous calco-magnesian suspension according to the present invention is therefore fluid at a high concentration of solid particles, with a lesser provision of organic materials than those provided by present solutions. Fluidity is determined by measurement of the viscosity. The term of fluid means that the viscosity is moderate, less than 1,500 mPa·s in particular less than or equal to 1,200 mPa·s, preferably less than or equal to 1,000 mPa·s, and more preferentially less than or equal to 800 mPa·s, advantageously less than or equal to 500 mPa·s.

The phosphonate or phosphonic acid present in the aqueous calco-magnesian suspension according to the present invention not only allows moderation of the viscosity of the aqueous calco-magnesian suspension freshly produced but also gives the possibility of acting as a brake on the increase of viscosity during the storage period.

Therefore, according to the present invention, an aqueous calco-magnesian suspension highly concentrated in solid particles may be formulated following addition of the phosphonate or of the phosphonic acid while benefiting from the two following effects, i.e. action as a viscosity reducer and as a viscosity increase moderator over time.

In the sense of the present invention, by the terms of « viscosity increase moderator » is meant that the viscosity remains less than or equal to 1,500 mPa·s, preferably less than or equal to 1,200 mPa·s, and more preferentially less than or equal to 1,000 mPa·s, advantageously less than or equal to 800 mPa·s, still more advantageously less than 500 mPa·s, after at least 2 weeks of storage with or without stirring, preferably after 1 month or more.

Phosphonates or phosphonic acids are typically complexing agents, chelators, polyfunctional agents which are active towards metal ions.

By definition, they include at least one functional group $PO_3^{2-}$ in the form of an acid or of its corresponding salt, bound to a carbon atom. The properties of phosphonates notably result from the phosphorus-carbon bond. These properties are a strong anionic (negative) charge, great solubility in water, stability in aqueous systems under extreme temperature and pH conditions and multiplicity of the bonding sites. Phosphonates therefore have several functionalities which improve the performance of aqueous systems, i.e.:

inhibition of the formation of scale by a threshold effect,
sequestration (complexation/chelation of metal ions),
dispersion of the solid particles of the suspension, notably reduction of scale deposits,
inhibition of electrochemical corrosion.

Their functional properties allow the use of these agents in many fields.

In the sense of the present invention the terms of « phosphonic acid » or « phosphonate » encompass the acid as such, or conjugate salts or mixtures thereof, the acid may be present in a form which is partly or totally neutralized, notably by an alkaline compound such as NaOH or KOH. The concentrations of phosphonate or phosphonic acid, whether the additive is in the partly or totally neutralized acid form, are expressed as « active acid » concentrations.

It has been shown according to the present invention that the use of phosphonate or phosphonic acid in calco-magnesian suspensions allows a reduced additive content as compared with the additives typically used in the state of the art, which gives the possibility of maintaining the properties of the calco-magnesian suspension and its efficiency, on the one hand, and of reducing the COD (chemical oxygen demand) and TOC (total organic carbon) on the other hand and therefore the environmental impact of the calco-magnesian suspensions used in certain applications, where regulatory constraints limit the use of suspensions stabilized with mainly organic additives and therefore rich in carbon, such as sugar and/or polymers, as this is the case for the treatment of certain liquid effluents. Further, the propensity of the additive to be adsorbed on a support, further reduces the COD in applications where a liquid/solid separation step is carried out by retaining the major part of the additive in the solid phase.

Moreover, according to the present invention, the presence of the phosphonates or of the phosphonic acid in calco-magnesian suspensions allows the latter to play its role of an inhibitor of scaling (threshold effect), leading to the reduction of precipitation of calcium carbonate or sulfate. This effect gives the possibility of increasing the maximum calcium concentration from which scaling of the equipment appears upon applying the calco-magnesian suspension to the treatment of liquid effluents.

According to the present invention, it was surprisingly observed that with the phosphonate or phosphonic acid additive, it is possible to produce calco-magnesian suspensions with limited viscosity and which especially curb the increase of this viscosity over time, or even reduce the viscosity during a certain period, during the ripening phenomenon of calco-magnesian suspensions. An explanation according to the present invention lies in the fact that the phosphonates are totally adsorbed on the particles of $Ca(OH)_2$ and/or of $Mg(OH)_2$ which reduces ripening of the calco-magnesian suspension. Hydrate particles are positively charged. Phosphonates have strong anionic (negative) charges. After neutralization of the $Ca(OH)_2$ particles, additional amounts of phosphonates will reverse the charge. The negative charges of the phosphonate groups will repel each other; which leads the particles to also repel each other, consequently reducing decantation and the possibility of establishing an interaction between them. Another advantage of the suspensions according to the invention is therefore to have less propensity to decantation. Finally, when the fluidity of the calco-magnesian suspension is improved, the amount of water may be reduced and its concentration and/or its fineness thereby increased.

Of course, according to the invention, it is preferable to have decantation as reduced as possible over time, in order to keep the suspension as homogeneous as possible without requiring subsequent stirring which often forces the calco-magnesian suspension to be stored in a tank provided with a stirrer.

Finally, the preparation of lime milk from quick lime with slaking with water or with an alkaline solution is known from document JP57196748. According to this document, an additive based on carboxylic acid is added, which may be from among other mentioned additives, 2-phosphonobutane-1,2,4 tricarboxylic acid in an amount from 1 to 30 g/metric ton of quick lime. However, no actual information may be inferred from this document as to possible moderation of the increase in viscosity. The very small amounts of additives applied are actually a priori insufficient for obtaining calco-magnesian suspensions of moderate viscosity according to the present invention.

In a preferred embodiment of the invention, said phosphonate or phosphonic acid comprises, in acid form, from 2 to 8, preferably from 2 to 6 characteristic « phosphonic acid » groups.

More particularly, said phosphonate or phosphonic acid is selected from the group consisting of aminotris(methylenephosphonic) acid (ATMP), of 1-hydroxyethylidene-1,1-diphosphonic acid (HEDP), of ethylenediamine tetrakis(methylenephosphonic) acid (EDTMP), of hexamethylenediamine tetrakis(methylenephosphonic) acid (HDTMP), of diethylenetriamine pentakis(methylenephosphonic) acid (DTPMP), of (2-hydroxy)ethylamino-N, N-bis (methylenephosphonic) acid (HEMPA), of 2-phosphono-1,2,4-butanetricarboxylic acid (PBTC), of 6-amino-1-hydroxyhexylene-N,N-diphosphonic acid (neridronic acid), of N,N'-bis(3-aminopropyl)ethylenediamine hexakis(methylenephosphonic) acid, of bis(hexamethylenetriamine) pentakis(methylenephosphonic) acid, of aminotris(methylenephosphonic) acid oxide, derivatives thereof such as their salts of their mixtures.

According to the present invention, said phosphonate or phosphonic acid is present at an active acid content greater than or equal to 0.05% by weight, preferably greater than or equal to 0.1% by weight, more preferentially greater than or equal to 0.5% by weight and in particular greater than or equal to 0.8% by weight, based on the total weight of said solid particles.

Also, according to the present invention, said phosphonate or phosphonic acid is present at an active acid content of less than or equal to 5% by weight, preferably less than or equal to 3% by weight, more preferentially less than or equal to 2% by weight and in particular less than or equal to 1.5% by weight, based on the total weight of said solid particles.

These concentrations of additives actually proved to be optimum. Actually, below these concentrations, the moderating effect on the increase in viscosity is not sufficient on the one hand. On the other hand, above these concentrations, a reduction in the viscosity is always observed but the impact is reduced relatively to the overcost of the addition of a higher additive content. Let us recall that the calco-magnesian suspensions according to the present invention have to remain economically competitive and that they do not typically belong to chemical reagents with very high added value.

Advantageously, the concentration of said solid particles in the aqueous phase is greater than or equal to 300 g/kg and preferably greater than or equal to 350 g/kg, more preferentially greater than or equal to 400 g/kg, in particular greater than or equal to 450 g/kg.

In a preferential embodiment of the present invention, said solid particles are particles of slaked lime fitting the formula a $Ca(OH)_2$.b $Mg(OH)_2$.c MgO wherein a is greater than or equal to 90%, preferably greater than or equal to 92%, and ever more preferentially greater than or equal to 94% by weight.

In an advantageous embodiment according to the present invention, said solid particles have a specific surface area calculated according to the BET method comprised between 4 and 25 m²/g.

In another just as advantageous embodiment, said solid particles have a $d_{50}$ measured by laser granulometry comprised between 1 and 20 μm.

In the present invention, the dimension $d_x$ ($d_{50}$ above) represents the diameter of the particles such that x %, (50% above) of the particles of the distribution are of a smaller size.

It is preferable to have a calco-magnesian suspension, in particular lime milk, characterized by a fine grain size distribution for promoting maintaining a suspension and as long as possible and for simultaneously obtaining better chemical reactivity. In order to ensure the grain size described, in certain embodiments, the aqueous calco-magnesian suspensions according to the present invention will be subject to a milling step and optionally to a sifting step.

Other embodiments of the aqueous calco-magnesian suspension are mentioned in the appended claims.

The present invention also relates to a method for making an aqueous calco-magnesian suspension comprising formation of the suspension of solid particles fitting a $Ca(OH)_2$.b $Mg(OH)_2$.c MgO wherein a, b and c are mass fractions, the sum of which has a value from 90 to 100% in a first aqueous phase, at a concentration greater than or equal to 200 g/kg of solid particles based on the weight of the suspension and an addition of an additive which is simultaneously a viscosity reducer and viscosity increase moderator.

The method according to the invention is characterized in that said additive is a phosphonate or phosphonic acid selected from organophosphonic acids, either containing nitrogen or not, or salts thereof, more particularly from the group consisting of aminoalkylene polyphosphonic acids, wherein the alkylene radical contains from 1 to 20 carbon atoms, of hydroxyalkylidene polyphosphonic acids, wherein the alkylidene radical contains from 2 to 50 carbon atoms, phosphono-alkanepolycarboxylic acids, wherein the alkane group contains from 3 to 12 carbon atoms and wherein the molar ratio of the alkylphosphonic acid radical to the carboxylic acid radical is in the range from 1:2 to 1:4, derivatives thereof, such as salts thereof, and mixtures thereof.

In a particular embodiment according to the present invention, said step for forming the suspension of solid particles comprises a mixture of solid particles fitting the general formula a Ca(OH)$_2$.b Mg(OH)$_2$.c MgO wherein a, b and c are mass fractions, the sum of which has a value from 90 to 100% with said first aqueous phase and therefore for example corresponds to a suspension of powdery slaked lime solid particles with an aqueous phase or to a mixture of a powdery solid phase comprising the slaked lime particles with an aqueous phase.

In an alternative of the method according to the invention, said step for forming the suspension of solid particles comprises a step for diluting a concentrated suspension of said solid particles or a concentrated slurry of said solid particles with said first aqueous phase and therefore for example corresponds to the scenario wherein a calcic or dolomitic lime milk would be used for forming the calcomagnesian suspension according to the invention.

In a further alternative according to the present invention, said step for forming the suspension of solid particles comprises a step for slaking quick lime, optionally dolomitic quick lime or quick dolime with said first aqueous phase with the obtaining of the aqueous calco-magnesian suspension of solid particles fitting the general formula a Ca(OH)$_2$.b Mg(OH)$_2$.c MgO wherein a, b and c are mass fractions, the sum of which has a value from 90 to 100%. In this specific case, the calco-magnesian suspension according to the invention is the direct result of slaking of a quick compound, for example quick lime with an aqueous phase.

Advantageously, said addition of said phosphonate or phosphonic acid takes place at said first aqueous phase, before, during or after forming said suspension of solid particles.

Said additive which is simultaneously a viscosity reducer and a viscosity increase moderator in the form of a phosphonate or a phosphonic acid is therefore, in a preferential embodiment, added to the first aqueous phase to which will be added the particles of slaked lime, to the first aqueous slaking phase, to the first aqueous dilution phase or further to the calco-magnesian suspension formed according to the invention.

In an alternative according to the present invention, said phosphonate or phosphonic acid is added to the quick lime or dolime, to the solid particles fitting the general formula a Ca(OH)$_2$.b Mg(OH)$_2$.c MgO wherein a, b and c are mass fractions, the sum of which has a value from 90 to 100% or further to said concentrated suspension or concentrated slurry of said solid particles.

In a particular embodiment of the method according to the present invention, the pH of the first aqueous phase is adjusted prior to adding phosphonate or phosphonic acid so as to guarantee total solubility of the latter.

In another particular embodiment of the method according to the invention, said phosphonate or phosphonic acid is added as a solution or suspension in a second aqueous phase.

Advantageously, the pH of the second aqueous phase is adjusted prior to the addition of phosphonate or phosphonic acid, so as to guarantee total solubility of the latter, in particular by means of a basic additive, in particular NaOH, KOH, NH$_4$OH and the like.

In another alternative according to the invention, said phosphonates is added in solid form, in particular in acid form or in salt form.

Advantageously, according to the invention, said phosphonate or phosphonic acid comprises in the form of an acid from 2 to 8, preferably from 2 to 6 « phosphonic acid » characteristic groups.

More particularly, said phosphonate or phosphonic acid is selected from the group consisting of aminotris(methylenephosphonic) acid (ATMP), of 1-hydroxyethylidene-1,1-diphosphonic acid (HEDP), of ethylenediamine tetrakis(m-ethylenephosphonic) acid (EDTMP), of hexamethylenediamine tetrakis(methylenephosphonic) acid (HDTMP), of diethylenetriamine pentakis(methylenephosphonic) acid (DTPMP), of (2-hydroxy)ethylamino-N,N-bis (methylenephosphonic) acid (HEMPA), of 2-phosphono-1, 2,4-butanetricarboxylic acid (PBTC), of 6-amino-1-hydroxyhexylene-N,N-diphosphonic acid (neridronic acid), of N,N'-bis(3-aminopropyl)ethylenediamine hexakis(methylenephosphonic) acid, of bis(hexamethylenetriamine) pentakis(methylenephosphonic) acid, of aminotris(methylenephosphonic) acid oxide, derivatives thereof such as salts thereof and mixtures thereof.

More particularly, said phosphonate or phosphonic acid is an aminoalkylene polyphosphonic acid wherein the alkylene radical contains from 1 to 12 carbon atoms, a hydroxyalkylene phosphonic acid wherein the alkylene radical contains from 2 to 12 carbon atoms and 2 groups of phosphonic acids or further one or several phosphono-alkane polycarboxylic acids wherein the alkane group contains from 4 to 8 carbon atoms and wherein the molar ratio of the methylphosphonic acid radical to the carboxylic acid radical is in the range from 1:2 to 1:4.

In a preferential embodiment, said phosphonate or phosphonic acid is added at an active acid content greater than or equal to 0.05% by weight, preferably greater than or equal to 0.1% by weight, more preferentially greater than or equal to 0.5% by weight and in particular greater than or equal to 0.8% by weight, based on the total weight of the solid particles.

Also, said phosphonate or phosphonic acid is present at an active acid content of less than or equal to 5% by weight, preferably less than or equal to 3% by weight, more preferentially less than or equal to 2% by weight and in particular less than or equal to 1.5% by weight, based on the total weight of the solid particles.

Advantageously, the concentration of the solid particles in the aqueous phase is greater than or equal to 300 g/kg and preferably greater than or equal to 350 g/kg, more preferentially greater than or equal to 400 g/kg, in particular greater than or equal to 450 g/kg.

In a particular aspect of the present invention, the obtained calco-magnesian suspension is deagglomerated in a wet milling machine in order to reach the desired grain size. It was also surprisingly observed that according to the present invention, the additive not only had the aim of reducing the viscosity and of slowing down the increase in viscosity over time, but it has an additional advantage in that it further improves the incorporation of hydrate (wetting of the hydrate) during the preparation of the calco-magnesian suspension by mixture with the aqueous phase and acts as a milling agent during wet milling.

Other embodiments of the method according to the present invention are mentioned in the appended claims.

The present invention also relates to a use of a phosphonate or phosphonic acid as an agent which is simultaneously a viscosity reducer and a viscosity increase moderator of an aqueous calco-magnesian suspension comprising solid particles fitting the general formula a $Ca(OH)_2$.b $Mg(OH)_2$.c MgO wherein a, b and c are mass fractions, the sum of which has a value from 90 to 100%, suspended in an aqueous phase at a concentration greater than or equal to 200 g of solid particles/kg of suspension, said phosphonate or phosphonic acid being selected from organophosphonic acids, either containing nitrogen or not, or salts thereof, more particularly from the group consisting of aminoalkylene polyphosphonic acids, wherein the alkylene radical contains from 1 to 20 carbon atoms, of hydroxyalkylidene polyphosphonic acids, wherein the alkylidene radical contains from 2 to 50 carbon atoms, of phosphono alkanepolycarboxylic acids, wherein the alkane group contains from 3 to 12 carbon atoms and wherein the molar ratio of the alkyl phosphonic radical to the carboxylic acid radical is in the range from 1:2 to 1:4, derivatives thereof, such as salts thereof and mixtures thereof.

Preferably, said phosphonate or phosphonic acid comprises in the form of an acid from 2 to 8, preferably from 2 to 6 « phosphonic acid » characteristic groups.

More particularly, said phosphonate or phosphonic acid is selected from the group consisting of aminotris(methylenephosphonic) acid (ATMP), of 1-hydroxyethylidene-1,1-diphosphonic acid (HEDP), of ethylenediamine tetrakis(methylenephosphonic) acid (EDTMP), of hexamethylenediamine tetrakis(methylenephosphonic) acid (HDTMP), of diethylenetriamine pentakis(methylenephosphonic) acid (DTPMP), of (2-hydroxy)ethylamino-N,N-bis (methylenephosphonic) acid (HEMPA), of 2-phosphono-1,2,4-butanetricarboxylic acid (PBTC), of 6-amino-1-hydroxyhexylene-N,N-diphosphonic acid (neridronic acid), of N,N'-bis(3-aminopropyl)ethylenediamine hexakis(methylenephosphonic) acid, of bis(hexamethylenetriamine) pentakis(methylenephosphonic) acid, of aminotris(methylenephosphonic) acid oxide, derivatives thereof such as salts thereof and mixtures thereof.

In a preferential use according to the invention, said phosphonate or phosphonic acid is present in an active acid content greater than or equal to 0.05% by weight, preferably greater than or equal to 0.1% by weight, more preferentially greater than or equal to 0.5% by weight and in particular greater than or equal to 0.8% by weight, based on the total weight of the solid particles.

Also, said phosphonate or phosphonic acid is present at an active acid content of less than or equal to 5% by weight, preferably less than or equal to 3% by weight, more preferentially less than or equal to 2% by weight and in particular less than or equal to 1.5% by weight, based on the total weight of the solid particles.

Advantageously, the concentration of solid particles of the aqueous phase is greater than or equal to 300 g/kg and preferably greater than or equal to 350 g/kg, more preferentially greater than or equal to 400 g/kg, in particular greater than or equal to 450 g/kg.

The present invention also relates to a use of a phosphonates or phosphonic acid as a reducing additive of the decantation of an aqueous calco-magnesian suspension comprising solid particles fitting the general formula a $Ca(OH)_2$.b $Mg(OH)_2$.c MgO wherein a, b and c are mass fraction, the sum of which has a value from 90 to 100%, in suspension in an aqueous phase at a concentration greater than or equal to 200 g/kg.

The invention will be better described and understood in the light of the examples given hereafter, in a non-limiting way. In Examples 1 to 3 and 6 to 9, the lime milks are prepared in the laboratory. In Examples 4, 5 and 11 the lime milks are made industrially.

EXAMPLE 1

The Use of Phosphonates for Improving Stability of Suspensions of Lime Milk

Milk of lime (MoL) suspensions are prepared according to the following process during a test on a laboratory scale.

The phosphonate is first diluted in a 1 $dm^3$ container filled with distribution water and equipped with a stirrer provided with a mobile with 4 blades. All the water required for making the milk of lime is thus treated by the added phosphonate.

A dry hydrate stemming from an industrial production site (slaked lime) containing 95.9% of calcium hydroxide is then gradually added to the mixture with stirring at 300 rpm. After 10 minutes of stirring, the milk of lime is transferred into a container and stored at 20° C. for a predetermined period of time ranging up to 1 month.

The concentration of hydrate (of solid material) in the suspension is of 45% by weight and the specific surface area measured according to the BET method by using an apparatus of the Micromeritics Tristar brand after degasing at 190° C. is 8 $m^2/g$.

The grain size curve, measured by granulometry with a laser with the Beckman Coulter LS 13 320 apparatus leads to the following data $d_{100}$=92 µm $d_{98}$=54 µm $d_{95}$=42 µm $d_{90}$=27 µm $d_{50}$=2.1 µm $d_{25}$=1.3 µm.

The different tested phosphonates are the following:
1. methylene amino-tris-phosphonic acid known under the acronym of ATMP and marketed by Zschimmer and Schwarz, in the form of a 50% active acid solution, designated as AP5.
2. methylene diethylenetriamine pentaphosphonic acid known under the name of DTPMP and marketed by Zschimmer and Schwarz in the form of a partly neutralized solution in the form of a 52% active acid sodium salt, designated as D5012.
3. phosphonobutane-tricarboxylic acid known under the acronym of PBTC and marketed by Zschimmer and Schwarz in the form of a 50% active acid solution, designated as P50.
4. 6-amino-1-hydroxyhexylidene diphosphonic acid known under the name of neridronic acid marketed by Rhodia as a powder.
5. N,N'-bis-(3-aminopropyl)ethylene diamine hexamethyl-phosphonic acid marketed by Thermphos in the form of a 30% active acid solution designated as D2086.

In this example, the proportion of phosphonates varies from 0.15 to 1% expressed in active acid based on the weight of the hydrate (slaked lime). The viscosity expressed in mPa·s is measured at 20° C. with a Brookfield DV III Ultra rheometer using an LV mobile rotating at 100 rpm. Mobile No. 61 is used for a viscosity ranging up to 60 mPa·s; mobile No. 62 for viscosities between 60 and 300 mPa·s, mobile No. 63 for up to 1,200 mPa·s. Mobile No, 64 allows measurements up to 6,000 mPa·s. However, beyond a certain value, the measurement is often unstable. For this reason, the measurement is not systematically conducted for viscosities above 1,200 mPa·s. The viscosity is measured on the lime milk suspension 1 hour after production (fresh product) and after 1, 2-3 and 4 weeks. Before each measurement, the milk of lime is homogenized by mechanical stirring. In the absence of an additive, the viscosity of such an milk of lime with 45% of solid material is greater than 3,000 mPa·s, which is a too high viscosity value for being accurately measured. The results with the additives according to the invention are indicated in Table 1.

TABLE 1

Milk of lime viscosity at 450 g/kg of solid material, treated with different additives according to the invention

| | Active acid in % | Viscosity in mPa · s | | | |
|---|---|---|---|---|---|
| | | fresh | 1 week | 2 weeks | 3 weeks | 4 weeks |
| ATMP | 0.25 | 1500 | | | | |
| | 0.5 | 1380 | | | | |
| | 1 | 440 | 880 | 1500 | | |
| DTPMP | 0.26 | 1900 | >1200 | | | |
| | 0.52 | 750 | >1200 | | | |
| | 1.04 | 150 | 140 | 140 | 200 | 200 |
| PBTC | 0.25 | 2070 | | | | |
| | 0.5 | 1500 | | | | |
| | 1 | 410 | 480 | 540 | 630 | 660 |
| Neridronic acid | 0.15 | 400 | 1150 | 1590 | 1650 | 1900 |
| | 0.25 | 190 | 880 | 1140 | 1280 | 1400 |
| | 0.5 | 22 | 660 | 650 | 640 | 650 |
| | 1 | 65 | 60 | 55 | 50 | 55 |
| N,N'bis-(3-aminopropyl) ethylene diamine hexamethyl-phosphonic acid | 0.15 | 570 | 795 | 910 | 950 | 1100 |
| | 0.3 | 470 | 670 | 770 | 840 | 870 |
| | 0.6 | 200 | 415 | 610 | 600 | 600 |

As this may be seen from the above table, the initial viscosity (fresh MoL) of the milk of lime according to the invention is less than or equal to 1,500 mPa·s in every case as soon as an addition of 0.5% of active acid is performed. For most phosphonates, a smaller addition is even sufficient. Except for ATMP, the viscosity does not increase much over time from a dosage of 1% of active acid, or even less. With 1% of additive, in at least certain cases, it is possible to obtain a viscosity after 2 weeks of less than or equal to 1,500 mPa·s, sometimes greatly lower. Certain additives added at 1% give the possibility of not exceeding 200 mPa·s after 4 weeks.

The efficiency of the phosphonates is then compared with saccharose and a polymer (Tech 646 available from Chryso) as well as their combinations according to the prior art. These additives are typically known to one skilled in the art for fluidifying milk of lime. Saccharose is added in the same way as the phosphonate while the polymer is added onto the milled suspension. When saccharose is combined with a polymer, the amount of additives to be added is reduced.

Surprisingly, with the phosphonate alone like in the case of DTPMP it is possible to obtain a more fluid milk of lime at lower doses than the additives of the prior art but also with less increase in viscosity over time. Thus, the flow properties of the obtained milk of lime by adding 1% of DTPMP are notably compared with those of an milk of lime obtained with 1.5% of saccharose. The results are indicated in Table 2.

TABLE 2

Milk of lime viscosity at 450 g/kg of solid material, treated with different additives according to the prior art

| | | Viscosity in mPa · s | | | | |
|---|---|---|---|---|---|---|
| % saccharose | % Tech 646 | fresh | 1 week | 2 weeks | 3 weeks | 4 weeks |
| 0.75 | | 450 | 570 | 590 | 590 | 600 |
| 1.5 | | 330 | 370 | 360 | 350 | 345 |
| | 0.4 | 850 | 1750 | | | |
| | 0.8 | 165 | 410 | 790 | 950 | >1000 |
| 0.75 | 0.4 | 100 | 235 | 370 | 360 | 320 |

EXAMPLE 2

The Use of DTPMP and/or of Neridronic Acid for Improving the Stability of Lime Milk Suspensions—Case of Wet Milling Lime milk suspensions were prepared according to the following process during a pilot test. The phosphonate is first diluted in a 10 dm$^3$ container filled with distribution water and equipped with a stirrer of the anchor type. All the water required for making the milk of lime is thus added with phosphonate.

A dry hydrate of industrial origin (slaked lime) containing about 95% of calcium hydroxide is then gradually added to the mixture by stirring at 150 rpm. After 30 minutes of stirring, the milk of lime is transferred into a wet milling machine equipped with glass beads.

After deagglomeration, the milk of lime is mixed at 150 rpm for 10 mins and then poured into a container and stored for a predetermined period of time which may range up to 1 month at 20° C. The hydrate (dry material) content in the lime milk is of 45% by weight.

The grain size curve of the original slaked lime measured by laser granulometry with the Beckman Coulter LS 13 320 apparatus leads to the following data $d_{100}$=257 μm
$d_{98}$=121 μm
$d_{95}$=81 μm
$d_{90}$=58 μm
$d_{50}$=9.3 μm
$d_{25}$=2.8 μm.

The specific surface area of the hydrate, analyzed by nitrogen absorption according to the BET method by using a Micromeritics TRISTAR, is 6 m$^2$/g. The throughput of the milling machine is adjusted so as to obtain a $d_{50}$ from 2.5 to 2.7 μm. The typical grain size after wet milling is the following:

$d_{100}$=31 μm
$d_{98}$=11 μm
$d_{95}$=8.7 μm
$d_{90}$=7.3 μm
$d_{50}$=2.5 μm
$d_{25}$=1.4 μm.

It is not possible to produce a lime milk with 45% of solid material with an average diameter of 2.5 μm without any additive. The milk of lime would block the wet milling machine.

The decantation kinetics are measured in % of supernatant liquid (lime water) relatively to the total volume after resting at 20° C. for 1, 2, 3 and 4 weeks. The supernatant is delimited by the boundary between the suspension and the lime water solution.

The viscosity and decantation results are respectively present in Tables 3 and 3bis.

TABLE 3

Milk of lime viscosity at 450 g/kg of solid, treated with additives according to the invention after wet milling

| | | Viscosity in mPa · s | | | | |
|---|---|---|---|---|---|---|
| Active acid in % | | fresh | 1 week | 2 weeks | 3 weeks | 4 weeks |
| DTPMP | 0.52 | 950 | 1050 | 1150 | 1200 | 1200 |
| | 0.78 | 590 | 420 | 400 | 385 | 395 |
| | 1.04 | 365 | 260 | 245 | 240 | 230 |
| Neridronic acid | 0.25 | 2100 | 2500 | 2750 | 3000 | 2850 |
| | 0.75 | 78 | 56 | 62 | 68 | 80 |

TABLE 3 bis

Milk of lime decantation at 450 g/kg of solid, treated with DTMP according to the invention after wet milling

| | | Decantation (% of supernatant liquid at rest) | | | |
|---|---|---|---|---|---|
| Active acid in % | | 1 week | 2 weeks | 3 weeks | 4 weeks |
| DTPMP | 0.52 | 11 | 16 | 18 | 19 |
| | 0.78 | 7 | 14 | 18 | 18 |
| | 1.04 | 2 | 3 | 4 | 7 |

As soon as the dose of additive is greater than or equal to 0.5% of active acid, the viscosity is less than or equal to 1,200 mPa·s even after 4 weeks and does not increase much or even decreases over time relatively to the initial viscosity. From 0.75% of active acid, the 4 week viscosity is less than or equal to 400 mPa·s, or even considerably lower. It is even possible to obtain with 0.75% of neridronic acid a value of 78 mPa·s on a fresh product without the latter significantly changing after 1 month of storage.

The efficiency of the phosphonates is compared with saccharose and a polymer (Tech 646 from Chryso) as well as their combinations, like in Example 1 and the results are shown in Tables 4 and 4bis, respectively.

TABLE 4

Milk of lime viscosity at 450 g/kg of solid, treated with additives according to the prior art after wet milling

| Saccha- rose % | Tech 646 % | Viscosity in mPa · s | | | | |
|---|---|---|---|---|---|---|
| | | fresh | 1 week | 2 weeks | 3 weeks | 4 weeks |
| 0.7 | 0.26 | 360 | 1980 | 2130 | 2200 | 2400 |
| 0.7 | 0.40 | 290 | 1600 | 1700 | 1890 | 2000 |
| 1 | 0.40 | 190 | 480 | 820 | 860 | 880 |
| 1 | 0.66 | 135 | 340 | 560 | 620 | 625 |

TABLE 4 bis

Milk of lime Decantation at 450 g/kg of solid, treated according to the prior art after wet milling

| Saccha- rose % | Tech 646 % | Decantation (% of supernatant liquid at rest) | | | |
|---|---|---|---|---|---|
| | | 1 week | 2 weeks | 3 weeks | 4 weeks |
| 0.7 | 0.26 | 4 | 4 | 4 | 4 |
| 0.7 | 0.40 | 4 | 4 | 5 | 5 |
| 1 | 0.40 | 7 | 9 | 10 | 11 |
| 1 | 0.66 | 9 | 9 | 11 | 11 |

Surprisingly, the phosphonates are much better moderators of the increase in viscosity over time than the combinations known to this day. It is seen that neridronic acid at 0.75% content is significantly better than the combination of 1% of saccharose+0.66% of Tech 646. The same applies for DTPMP after one week of storage or more.

As regards decantation, comparison of Tables 3, 3bis on the one hand and 4, 4bis on the other hand shows:
  that with saccharose+Tech 646 polymer (prior art), any dosage increase of additives is accompanied by a reduction in viscosity but on the contrary causes an undesirable increase in decantation.
  that with DTPMP (according to the invention), any additive dosage increase is accompanied by a reduction in viscosity and favorable reduction in decantation.

EXAMPLE 3

The Use of DTPMP (in the D5012 Form of Zschimmer and Schwarz) for Improving the Fluidity of Lime Milk Suspensions—Case of Slaked Limes with Different Particle Size Distributions Example 1 is reproduced except for the fact that the three tested hydrates, also of industrial origin (slaked limes) have the following characteristics.

The specific surface area analyzed by nitrogen absorption according to the BET method using a Micromeritics Tristar is 18 m$^2$/g.

The grain size curve, measured by laser granulometry with the Beckman Coulter LS 13 320 apparatus leads to the data shown in Table 5.

TABLE 5

Grain size distribution of 3 industrial slaked limes used for preparing milk of lime

| Size of the particles | Hydrate 1 (fine) | Hydrate 2 (medium) | Hydrate 3 (coarse) |
|---|---|---|---|
| $d_{100}$ | 194 μm | 257 μm | 257 μm |
| $d_{98}$ | 73 μm | 129 μm | 137 μm |
| $d_{95}$ | 53 μm | 92 μm | 113 μm |
| $d_{90}$ | 29.7 μm | 68 μm | 89 μm |
| $d_{50}$ | 5.3 μm | 6.5 μm | 12.2 μm |
| $d_{25}$ | 2.8 μm | 2.8 μm | 2.8 μm |

The dry hydrate contains about 95% of calcium hydroxide. The amounts of D5012 are respectively 0.25; 0.5; 1 and 4.5% expressed in commercial product, which means that the amount of active ingredient expressed in active acid is 0.13, 0.26; 0.52 and 2.34% expressed relatively to the weight of the hydrate. The hydrate content is 40% by weight. The results of flow properties are indicated in Table 6 for variable DTPMP contents.

TABLE 6

Milk of lime viscosity at 400 g/kg of lime 1, 2 or 3 of Table 5, treated with DTMP according to the invention

| Hydrate | Active acid in % | Viscosity in mPa · s | | | | |
|---|---|---|---|---|---|---|
| | | fresh | 1 week | 2 weeks | 3 weeks | 4 weeks |
| 1 | 0 | 1100 | 2200 | 2500 | 2600 | 3000 |
| 1 | 0.13 | 370 | 600 | 650 | 860 | 1200 |
| 1 | 0.26 | 310 | 560 | 600 | 550 | 630 |
| 1 | 0.52 | 260 | 425 | 470 | 475 | 505 |
| 2 | 0 | 370 | 970 | 1150 | 1250 | 1350 |
| 2 | 0.13 | 150 | 225 | 240 | 285 | 330 |
| 2 | 0.26 | 115 | 190 | 200 | 215 | 240 |
| 2 | 0.52 | 85 | 135 | 150 | 165 | 200 |
| 3 | 0 | 265 | 540 | 725 | 860 | 1300 |
| 3 | 0.13 | 125 | 190 | 210 | 220 | 235 |
| 3 | 0.26 | 90 | 140 | 160 | 170 | 190 |
| 3 | 0.52 | 65 | 100 | 115 | 125 | 150 |

For the 3 slaked limes, the suspensions have acceptable viscosities even after 4 weeks from a 0.13% dosage of active acid. Viscosities below 400 mPa·s, sometimes considerably below, are obtained in the case of the last two slaked limes, quasi without any change over time.

The efficiency of D5012 is then compared with saccharose. The obtained flow data are shown in Table 7.

TABLE 7

Milk of lime viscosity at 400 g/kg of lime 1, 2 or 3 of Table 5, treated according to the prior art

| Hydrate | Saccharose in % | Viscosity in mPa · s | | | | |
|---|---|---|---|---|---|---|
| | | fresh | 1 weeks | 2 weeks | 3 weeks | 4 weeks |
| 1 | 0.25 | 300 | 1200 | >1200 | >1200 | >1200 |
| 1 | 0.5 | 240 | 750 | 650 | 710 | 820 |
| 1 | 1 | 220 | 435 | 390 | 405 | 540 |
| 2 | 0.25 | 100 | 270 | 295 | 340 | 380 |
| 2 | 0.5 | 80 | 140 | 140 | 160 | 180 |
| 2 | 1 | 65 | 100 | 100 | 105 | 120 |
| 3 | 0.25 | 83 | 110 | 120 | 135 | 160 |
| 3 | 0.5 | 70 | 90 | 95 | 110 | 120 |
| 3 | 1 | 50 | 65 | 70 | 75 | 80 |

It is seen that with DTMP it is possible to obtain a more fluid milk of lime at smaller doses than with saccharose.

The efficiency of DTPMP is than tested in the case of more concentrated suspensions (MoL) (450 g/kg and 500 g/kg) from hydrate No. 2. The obtained flow data are shown in Table 8.

TABLE 8

Milk of lime viscosity at 450 g/kg and 500 g/kg of lime 2 of Table 5, treated according to the invention

| Solid content in % | Active acid % | Viscosity in mPa · S | | | | |
|---|---|---|---|---|---|---|
| | | fresh | 1 weeks | 2 weeks | 3 weeks | 4 weeks |
| 45 | 0.26 | 360 | 585 | 710 | 730 | 860 |
| 45 | 0.52 | 280 | 450 | 615 | 645 | 770 |
| 50 | 2.34 | 680 | 1050 | 1280 | 1300 | 1380 |

The hydrate content varies from 45 to 50% by weight. As this may be seen, D5012 with 0.26% of active material gives the possibility of maintaining an Milk of lime fluid at 45% by weight.

Milk of lime at 50% may even be contemplated while retaining a viscosity of less than 1,500 mPa·s after 4 weeks.

EXAMPLE 4

The Use of DTPMP for Improving the Stability of a Milled Suspension of Lime Milk Produced on an Industrial Scale A lime milk suspension according to the invention is prepared industrially according to the following process.

225 kg of D5012 (DTPMP marketed by Zschimmer and Schwarz) are dissolved in a stirred tank containing 13.5 m³ of water.

After homogenization, 11.3 tons of hydrate with a low specific surface area (8 m²/g) having an average diameter $d_{50}$ of 6.7 μm are gradually added for ½ an hour.

The thereby obtained suspension with 45% of solid material (hydrate) is then deagglomerated in a wet milling machine until it reaches a $d_{50}$ of 3.2 μm and a $d_{98}$ of less than 10 μm. The results of the viscosity measurements are shown in Table 9.

TABLE 9

Viscosity of an industrial milk of lime at 450 g/kg of solid, treated with DTMP according to the invention

| Active acid | % of active acid | Viscosity in mPa · s | | | | |
|---|---|---|---|---|---|---|
| | | Fresh | 1 day | 2 days | 3 days | 5 days | 11 days |
| DTPMP | 1.04 | 520 | 410 | 390 | 375 | 350 | 350 |

It is seen just like in the tests on the laboratory scale (Example 2, Table 3) that the viscosity drops over time. The viscosity values are consistent with the laboratory scale even if the viscosity levels are a little higher than in Example 2 for the same treatment.

The efficiency of DTPMP is compared with a suspension of the prior art prepared in a similar way but with saccharose and a polymer (Tech 646 from Chryso). The results of the viscosity measurements are shown in Table 10.

TABLE 10

Viscosity of industrial milk of lime at 405 g/kg of solid, treated according to the prior art

| Saccharose % | Tech 646 % | Viscosity in mPa · s | | | | |
|---|---|---|---|---|---|---|
| | | Fresh | 1 day | 2 days | 3 days | 5 days | 11 days |
| 0.75 | 0.4 | 270 | 490 | 500 | 510 | 560 | 605 |

It is observed that the viscosity of a suspension formulated with 0.75% of saccharose and 0.4% of polymer increases after 11 days from 270 to 605 mPa·s.

The same suspension made with 1.04% of DTPMP during the same period has its viscosity decrease from 520 to 330 mPa·s.

By slowing down the increase in viscosity, or even by reducing viscosity, DTPMP has the additional advantage of being able to tolerate a higher initial viscosity. This has the effect of reducing the tendency to decantation.

Indeed, in the present state of the art, the latter generally occurs within the first days after production, i.e. when the viscosity is the lowest.

The decrease in the viscosity of the lime milk over time produced with DTPMP therefore has the additional advantage of reducing the tendency to decantation. On a fresh product, the suspension prepared with DTPMP has a higher initial viscosity than that of the prior art, which will slow down the decantation kinetics.

EXAMPLE 5

The Use of DTPMP for Improving the Stability of a Suspension with Average Grain Size of Lime Milk Produced on an Industrial Scale 40 tons of milk of lime (MoL) with 40% of solid material with 0.25% (expressed relatively to the hydrate) of D5012 marketed by Zschimmer and Schwarz are produced from a mixture of water and of the hydrate 2 with medium grain size of Example 3, Table 5.

Unlike the corresponding laboratory test, the industrial lime milk is maintained with permanent stirring in its preparation tank. The results of viscosities are shown in Table 11.

TABLE 11

Milk of lime viscosity with 400 g/kg of lime 2 of Table 5

| Active acid | % of active acid | Viscosity in mPa · s | | | |
|---|---|---|---|---|---|
| | | Fresh | 3 days | 10 days | 17 days | 35 days |
| DTPMP | 0.13 | 200 | 200 | 260 | 330 | 450 |

It is seen that only 0.13% of DTPMP expressed on the basis of the dry hydrate gives the possibility of maintaining the viscosity at 450 mPa·s after more than 1 month with permanent stirring.

A sample left at rest during the same period has a viscosity of 310 mPa·s; i.e. a value similar to the one obtained in Example 3, Table 6 during tests on a laboratory scale.

EXAMPLE 6

Use of DTPMP for Reducing the Decantation Kinetics of a Coarse Suspension of Milk of Lime The tests of Example 2 are reproduced with the purpose of measuring the decantation kinetics in the case of the milk of lime after wet milling with 450 g/kg of solid material.

The grain size curve measured by laser granulometry with the Beckman Coulter LS 13320 apparatus leads to the following data:
$D_{100}$=41 µm
$D_{98}$=13 µm
$D_{95}$=10 µm
$D_{90}$=8 µm
$D_{50}$=2.6 µm
$D_{25}$=1.3 µm.

The decantation kinetics is measured as a % of supernatant liquid based on the total volume after resting at 20° C. for 1 day, 1, 2, 3 and 4 weeks. The viscosity and decantation results of the lime milks according to the invention, prepared with DTPMP, are shown in Tables 12A and 12B. Table 12A shows the viscosity results which are consistent with those of Table 3.

TABLE 12 A

Milk of lime viscosity at 450 g/kg of solid material treated with DTMP according to the invention after wet milling

| Active acid | % of active acid | Viscosity in mPa · s | | | | |
|---|---|---|---|---|---|---|
| | | Fresh | 1 week | 2 weeks | 3 weeks | 4 weeks |
| DTPMP | 0.52 | 790 | 650 | 695 | 755 | 760 |
| | 0.78 | 515 | 360 | 345 | 320 | 335 |
| | 1.04 | 450 | 350 | 345 | 350 | 340 |
| | 1.56 | 380 | 295 | 290 | 290 | 280 |

TABLE 12 B

Milk of lime decantation at 450 g/kg of solid treated with DTMP according to the invention after wet milling

| Active acid | % of active acid | Decantation (% of lime water at rest) | | | | |
|---|---|---|---|---|---|---|
| | | 1 day | 1 week | 2 weeks | 3 weeks | 4 weeks |
| DTPMP | 0.52 | 4 | 9 | 12 | 13 | 14 |
| | 0.78 | 3 | 7 | 7 | 8 | 9 |
| | 1.04 | 3 | 7 | 8 | 8 | 9 |
| | 1.56 | 2 | 7 | 7 | 7 | 7 |

It is seen just like in Example 2, Table 3 that increasing the DTPMP dosage significantly reduces the viscosity but surprisingly also reduces the decantation kinetics.

This phenomenon is unexpected in the sense that low viscosity is known to one skilled in the art as a factor increasing decantation.

Any reduction of decantation is appreciated by the final user in the sense that it reduces the stirring needs, further allows storage in small packagings, facilitates resuspension and causes less clogging of piping.

The efficiency of DTPMP is compared with a lime milk according to the prior art, prepared with saccharose and a polymer (Tech 646 from Chryso). The results are shown in Table 13A and B.

TABLE 13 A

Milk of lime viscosity at 450 g/kg of solid material prepared according to the prior art

| Saccharose % | Tech 646 % | Viscosity in mPa · s | | | | |
|---|---|---|---|---|---|---|
| | | Fresh | 1 week | 2 weeks | 3 weeks | 4 weeks |
| 1 | 0.66 | 105 | 250 | 435 | 505 | 500 |

TABLE 13 B

Milk of lime decantation at 450 g/kg of solid prepared according to the prior art

| Saccharose % | Tech 646 % | Decantation (% of lime water at rest) | | | | |
|---|---|---|---|---|---|---|
| | | 1 day | 1 week | 2 weeks | 3 weeks | 4 weeks |
| 1 | 0.66 | 5 | 14 | 15 | 15 | 15 |

It is seen that the lime milk produced initially with DTPMP causes less decantation than the one of the prior art.

EXAMPLE 7

The Use of DTPMP for Improving the Stability of a Suspension of Lime Milk with Medium Grain Size Maintained at 45° C.

40% lime milk suspensions are produced from the hydrate 2 of Table 5, as described in Example 3 in Table 6. These suspensions are stored with stirring at 4, 20 and 45° C. with the purpose of measuring their ripening, for which it is known to one skilled in the art that it is accelerated by temperature.

The results are shown in Table 14,

TABLE 14

Influence of DTPMP on the ripening of a 40% milk of lime stored at 45° C.

| Active acid | % of active acid | Temperature in ° C. | Viscosity in mPa · s Fresh | 4 weeks |
|---|---|---|---|---|
|  | 0 | 4 | 330 | 635 |
|  | 0 | 20 |  | 1150 |
|  | 0 | 45 |  | 1500 |
| DTPMP | 0.26 | 4 | 130 | 305 |
|  | 0.26 | 20 |  | 195 |
|  | 0.26 | 45 |  | 260 |

It is seen that with 0.26% of DTPMP it is possible to maintain the viscosity of the suspension having ripened at 45° C. well below 500 mPa·s after 4 weeks while the same suspension without any additive no longer has an acceptable viscosity.

EXAMPLE 8

The Use of DTPMP for Improving Stability of a Milled Suspension of Lime Milk Maintained at 45° C.

The samples of Example 6 are subject to the same test as those described in Example 7. The efficiency of DTPMP is compared with a lime milk according to the prior art prepared with saccharose and a polymer (Tech 646 from Chryso).

TABLE 15

Influence of DTPMP on the ripening of a 45% milled milk of lime stored at 45° C.

| Active acid | % of active acid | Temperature in ° C. | Viscosity in mPa · s Fresh | 4 weeks |
|---|---|---|---|---|
| DTPMP | 0.52 | 4 |  | 665 |
|  | 0.52 | 20 | 725 | 765 |
|  | 0.52 | 45 |  | 1010 |
|  | 1.04 | 4 |  | 300 |
|  | 1.04 | 20 | 320 | 320 |
|  | 1.04 | 45 |  | 340 |
|  | 1.56 | 4 |  | 105 |
|  | 1.56 | 20 | 105 | 110 |
|  | 1.56 | 45 |  | 125 |

It is seen that the lime milk initially formulated with 1.04% or 1.56% of DTPMP does not age at 45° C.; which is not the case with 1% of saccharose and 0.6% of Tech 646 (Table 16).

TABLE 16

Influence of saccharose + polymer on the ripening of a 45% milled milk of lime stored at 45° C.

| Saccharose % | Tech 646 % | Temperature in ° C. | Viscosity in mPa · s Fresh | 4 weeks |
|---|---|---|---|---|
| 1 | 0.66 | 4 |  | 400 |
| 1 | 0.66 | 20 | 410 | 455 |
| 1 | 0.66 | 45 |  | 610 |

EXAMPLE 9

The Use of ATMP and PBTC for Suppressing Decantation of a 45% Lime Milk Milled Suspension Lime milk suspensions were prepared according to the process of Example 2 by using DTPMP, ATMP and PBTC. The viscosity results are shown in Table 17.

As already illustrated in Example 1, Table 1, ATMP and PBTC are not the most performing phosphonates in terms of efficiency for reducing viscosity.

On the other hand, at a suitable dosage, they manage just like DTPMP to slow down the increase in viscosity or even reduce it over time.

TABLE 17

Influence of ATMP and of PBTC on the viscosity of a suspension of lime milk, finely milled with 45% of solid materials.

| | Active acid in % | Viscosity in mPa · s | | | | |
|---|---|---|---|---|---|---|
| | | fresh | 1 week | 2 weeks | 3 weeks | 4 weeks |
| DTPMP | 1.04 | 380 | 310 | 300 | 305 | 280 |
|  | 1.56 | 410 | 325 | 310 | 310 | 315 |
| ATMP | 1 | 870 | 765 | 740 | 730 | 735 |
|  | 1.75 | 1000 | 1015 | 965 | 955 | 925 |
| PBTC | 1 | 910 | 810 | 810 | 855 | 860 |
|  | 1.25 | 1060 | 975 | 960 | 975 | 970 |
| ATMP + PBTC | 0.5% each | 840 | 810 | 795 | 800 | 810 |
|  | 0.62% each | 860 | 825 | 830 | 820 | 830 |

By targeting a viscosity around 700 to 800 mPa·s, perfectly acceptable for handling the suspension, it is possible to keep it at this level over time and prevent any decantation for the milks treated with ATMP or PBTC, as shown by Table 18.

TABLE 18

Influence of ATMP and of PBTC on the decanation of a finely milled lime milk suspension with 45% of solid materials.

| | Active acid in % | Decantation (% of supernatant liquid at rest) | | | |
|---|---|---|---|---|---|
| | | 1 day | 1 week | 2 weeks | 3 weeks |
| DTPMP | 1.04 | 0.7 | 3.5 | 6.0 | 7.8 |
|  | 1.56 | 0.8 | 2.8 | 4 | 4.8 |
| ATMP | 1 | 0.1 | 0.3 | 0.3 | 0.5 |
|  | 1.75 | 0.1 | 0.1 | 0.5 | 0.8 |
| PBTC | 1 | 0.3 | 0.3 | 0.3 | 0.3 |
|  | 1.25 | 0.1 | 0.1 | 0.3 | 0.3 |
| ATMP + PBTC | 0.5% each | 0.5 | 0.5 | 0.5 | 0.5 |
|  | 0.62% each | 0.5 | 0.5 | 0.5 | 0.5 |

Here again, it is seen that the lime milk initially formulated with phosphonates does not age; which is not the case with 1% of saccharose and 0.6% of Tech 646 (Tables 19 and 20).

TABLE 19

Influence of saccharose + polymer on the viscosity of a finely milled milk of lime suspension with 45% of solid materials.

| Saccharose % | Tech 646 % | Viscosity in mPa · s | | | | |
|---|---|---|---|---|---|---|
| | | Fresh | 1 week | 2 weeks | 3 weeks | 4 weeks |
| 1 | 0.66 | 95 | 145 | 200 | 250 | 275 |
| 1 | 0.26 | 240 | 455 | 725 | 820 | 860 |

It is observed that the suspension initially formulated with saccharose+polymer decants more rapidly, especially during the first days.

TABLE 20

Influence of saccharose + polymer on the decantation of a finely milled lime milk suspension with 45% of solid materials.

| Saccharose % | Tech 646 % | Decantation (% of supernatant liquid at rest) | | | |
|---|---|---|---|---|---|
| | | 1 day | 1 week | 2 weeks | 3 weeks |
| 1 | 0.66 | 8.0 | 19 | 19 | 19 |
| 1 | 0.26 | 0.5 | 5 | 5 | 5 |

Surprisingly, while one skilled in the art agrees with the consideration that it is impossible to prevent decantation of a lime milk, ATMP and PBTC a milk of lime ost suppress any decantation of a finely milled 45% milk of lime.

The suspension was introduced into graduated cylinders with a height of 35 cm, a diameter of 6.5 cm. At regular intervals, the lime milk column was separated into 3 (high, medium and low fraction). Each of the fractions was characterized in terms of grain size, viscosity and dry extract. The results of the characterization of the milks of Tables 17 and 18 treated with ATMP+PBTC each with 0.5% of active acid, are shown in Table 21.

It is seen that the suspension remains homogeneous in terms of concentration, grain size and viscosity through the whole column with a height of 35 cm after 3 weeks of storage at rest.

TABLE 21

Characterization of the fractions of suspensions collected at different heights after adding 0.5% of ATMP and 0.5% of PBTC

| | Laser granulometry | | | | | | Dry extract | Viscosity |
|---|---|---|---|---|---|---|---|---|
| | $d_{100}$ (μm) | $d_{98}$ (μm) | $d_{95}$ (μm) | $d_{90}$ (μm) | $d_{50}$ (μm) | $d_{25}$ (μm) | (%) | (mPa · s) |
| Fresh product | 43.7 | 24.6 | 12.0 | 9.7 | 2.9 | 1.5 | 44.9 | 840 |
| After 1 week | | | | | | | | |
| High fraction | 43.7 | 23.9 | 11.5 | 9.3 | 2.8 | 1.4 | 44.6 | 740 |
| Central fraction | 43.7 | 24.8 | 12.5 | 9.8 | 2.9 | 1.4 | 45.1 | 840 |
| Low fraction | 43.7 | 24.4 | 12.2 | 9.7 | 2.9 | 1.4 | 45.3 | 830 |
| After 3 weeks | | | | | | | | |
| High fraction | 43.7 | 25.0 | 12.5 | 9.8 | 2.9 | 1.4 | 44.6 | 790 |
| Central fraction | 43.7 | 24.8 | 12.1 | 9.7 | 2.9 | 1.4 | 45.0 | 865 |
| Low fraction | 43.7 | 27.3 | 14.1 | 10.1 | 2.9 | 1.4 | 45.1 | 880 |

As a comparison, it is seen that the suspension with addition of 1% of saccharose and 0.26% of Tech 646 polymer is no longer homogeneous already after 1 week.

TABLE 22

Characterization of the fractions of suspensions collected at different heights after addition of 1% of saccharose and 0.66% of Tech 646 polymer.

| | Laser granulometry | | | | | | Dry extract | Viscosity |
|---|---|---|---|---|---|---|---|---|
| | $d_{100}$ (μm) | $d_{98}$ (μm) | $d_{95}$ (μm) | $d_{90}$ (μm) | $d_{50}$ (μm) | $d_{25}$ (μm) | (%) | (mPa · s) |
| Fresh product | 83.9 | 28.7 | 22.9 | 11.5 | 3.3 | 1.5 | 45.2 | 95 |
| After 1 week | | | | | | | | |
| High fraction | 83.9 | 30.4 | 23.4 | 10.9 | 2.9 | 1.4 | 26.2 | 20 |
| Central fraction | 92.1 | 34.1 | 25.2 | 12.7 | 3.4 | 1.5 | 52.7 | 560 |
| Low fraction | 92.1 | 32.9 | 25.1 | 12.3 | 3.3 | 1.5 | 53.3 | 635 |
| After 3 weeks | | | | | | | | |
| High fraction | 83.9 | 27.97 | 21.24 | 10.33 | 2.96 | 1.516 | 27.57 | 30 |
| Central fraction | 83.9 | 29.46 | 23.54 | 11.48 | 3.211 | 1.498 | 51.89 | 970 |
| Low fraction | 83.9 | 33.32 | 24.73 | 12.3 | 3.309 | 1.512 | 53.16 | 1170 |

EXAMPLE 10

Influence of the Fineness of the Suspension and of the Dosage of Additives on the Viscosity and Decantation The tests of Example 2 are reproduced with suspensions according to the prior art except for the fact that the throughput of the milling machine is adjusted in order to obtain a ds of 2.4 or 2.7 μm.

The decantation kinetics are measured according to Example 6.

TABLE 23

Influence of the grain size on the viscosity of a finely milled lime milk suspension with 45% of solid material of the prior art

| Saccha- | Tech | | Viscosity en mPa · s | | | | |
|---|---|---|---|---|---|---|---|
| rose % | 646 % | $d_{50}$ in μm | Fresh | 1 week | 2 weeks | 3 weeks | 4 weeks |
| 1 | 0.4 | 2.4 | 235 | 800 | 875 | 970 | 935 |
| 1 | 0.4 | 2.7 | 145 | 480 | 560 | 590 | 580 |

TABLE 24

Influence of the content of Chryso Tech 646 polymer on the viscosity of a finely milled lime milk suspension with 45% of solid material of the prior art ($d_{50}$ = 2.9 μm)

| Saccha- | Tech | Viscosity en mPa · s | | | | |
|---|---|---|---|---|---|---|
| rose % | 646 % | Fresh | 1 week | 2 weeks | 3 weeks | 4 weeks |
| 1 | 0.4 | 145 | 480 | 560 | 590 | 580 |
| 1 | 0.5 | 40 | 90 | 110 | 130 | 130 |
| 1 | 0.6 | 35 | 98 | 110 | 112 | 112 |
| 1 | 0.7 | 59 | 193 | 200 | 205 | 220 |

With the composition of the prior art, saccharose+Tech 646 polymer, it is seen that a $d_{50}$ variation from 2.7 to 2.4 μm induces a strong variation of viscosity.

Increasing the polymer content from 0.4 to 0.5% also causes a strong variation of viscosity.

TABLE 25

Influence of the Chryso Tech 646 polymer content on the decantation of a finely milled lime milk suspension with 45% of solid material of the prior art ($d_{50}$ = 2.9 μm)

| Saccha- | Tech | decantation (% of supernatant liquid at rest) | | | |
|---|---|---|---|---|---|
| rose % | 646 % | 1 jour | 1 week | 2 weeks | 3 weeks |
| 1 | 0.4 | 1.0 | 2.0 | 2.0 | 2.0 |
| 1 | 0.5 | 8.6 | 8.6 | 8.6 | 8.6 |
| 1 | 0.6 | 5.6 | 10.1 | 10.1 | 10.1 |
| 1 | 0.7 | 12.3 | 14.0 | 14.0 | 14.0 |

The variations of grain size of dosage of the polymer, commonly encountered on an industrial scale, consequently cause strong perturbations on decantation, in the case of a suspension according to the prior art.

On the contrary, according to the present invention, significant variations of DTPM dosage, of the order of three times the recommended dose (1%) for obtaining a suspension with acceptable viscosity, do not cause any substantial modification of viscosity (see Table 26).

Decantations are low and unexpectedly all the lower since the DTMP dosage is high (see Table 27).

Accordingly, DTMP gives the possibility of doing without production variations, overdosage not causing any increase in decantation.

TABLE 26

Influence of the DTMP content on the viscosity of a finely milled lime milk suspension with 45% of solid material according to the invention (d50 = 2.4 μm)

| Active acid | Viscosity in mPa · s | | | | |
|---|---|---|---|---|---|
| in % of DTPMP | Fresh | 1 week | 2 weeks | 3 weeks | 4 weeks |
| 0.52 | 1580 | 3600 | 4400 | 4400 | 4400 |
| 1.04 | 710 | 590 | 550 | 530 | 525 |
| 1.56 | 580 | 520 | 480 | 480 | 460 |
| 3.12 | 680 | 560 | 581 | 587 | 590 |

TABLE 27

Influence of the DTMP content on the decantation of a finely milled lime milk suspension with 45% of solid material according to the invention (d50 = 2.4 μm)

| Active acid | decantation (% of supernatant liquid at rest) | | | |
|---|---|---|---|---|
| in % of DTPMP | 1 day | 1 week | 2 weeks | 3 weeks |
| 0.52 | 0.5 | 1.5 | 1.5 | 1.5 |
| 1.04 | 0.5 | 2.5 | 2.5 | 3.0 |
| 1.56 | 1.0 | 2.2 | 2.5 | 2.5 |
| 3.12 | 0.0 | 1.0 | 1.0 | 1.0 |

EXAMPLE 11

The Use of DTMP According to the Invention in Order to Obtain a Finished Product with a More Constant Characteristic—Case of an Industrially Produced Milled Milk of Lime 20 tons of lime milk according to the invention with 45% of solid material with 3% (expressed relatively to the hydrate) of D5012 marketed by Zschimmer and Schwartz are produced following the same preparation principle as in Example 2.

The grain size of the lime milk is adjusted by modifying the throughput rate (4.6 to 52 m³/h) in the milling machine, as well as the speed of rotation of the milling machine (450 to 650 rpm).

TABLE 28

Influence of grain size on the viscosity of a finely milled lime milk suspension with 45% of solid material according to the invention

| Active acid in % of DTPMP | Production rate m³/h | Speed of rotation of the milling machine rpm | $d_{50}$ in μm | Viscosity in mPa·s | | | | | | |
|---|---|---|---|---|---|---|---|---|---|---|
| | | | | Fresh | 1 day | 1 wk | 2 wks | 3 wks | 4 wks | 12 wks |
| 1.56 | 5.2 | 450 (70%) | 3.2 | 350 | 340 | 300 | 290 | 310 | 310 | 350 |
| 1.56 | 5.1 | 550 (85%) | 3.0 | 430 | 390 | 355 | 340 | 350 | 340 | 415 |
| 1.56 | 4.6 | 650 (100%) | 2.8 | 590 | 490 | 450 | 420 | 430 | 425 | 505 | wk = week

It is seen that a modification of the $d_{50}$ from 2.8 to 32 μm only modifies the viscosity after 4 weeks from 425 to 310 mPa·s. Even after 12 weeks, the viscosity is not significantly higher in the first case than in the second case.

Decantation, as for it, is low when Table 29 is compared with the results of Table 25. Moreover, this decantation increases very little over time and remains limited, even with coarser suspensions ($d_{50}$ of 3.2 μm).

TABLE 29

Influence of the DTMP content on the decantation of a finely milled lime milk suspension with 45% of solid material according to the invention

| Active acid in % of DTPMP | $d_{50}$ in μm | decantation (% of supernatant liquid at rest) | | | | | |
|---|---|---|---|---|---|---|---|
| | | 1 day | 1 wk | 2 wks | 3 wks | 4 wks | 12 wks |
| 1.56 | 3.2 | 1.0 | 5.5 | 7.0 | 7.2 | 7.2 | 7.5 |
| 1.56 | 3.1 | 1.0 | 4.0 | 5.0 | 5.0 | 5.0 | 5.5 |
| 1.56 | 2.8 | 1.0 | 2.0 | 2.5 | 2.8 | 3.0 | 3.0 | wk = week

It is quite understood that the present invention is by no means limited to the embodiments described above and that modifications may be made thereto without departing from the scope of the appended claims.

The invention claimed is:

1. An aqueous calco-magnesian suspension comprising solid particles fitting the general formula a Ca(OH)$_2$.b Mg(OH)$_2$.c MgO.d I in an aqueous phase at a concentration greater than or equal to 200 g/kg, wherein a, b and c represent mass fractions, the sum of which has a value from 90 to 100%, and a is greater than or equal to 90% by weight, the sum of b and c is higher than 0, and d has a value from 0 to 10% as a mass fraction, I representing impurities, and an additive which is simultaneously a viscosity reducer and a viscosity increase moderator, characterized in that said additive is a phosphonate or a phosphonic acid, selected from the group consisting of aminoalkylene polyphosphonic acids, wherein the alkylene radical contains from 1 to 20 carbon atoms, of hydroxyalkylidene polyphosphonic acids, wherein the alkylidene radical contains from 2 to 50 carbon atoms, phosphono-alkanepolycarboxylic acids, wherein the alkane group contains from 3 to 12 carbon atoms and wherein the molar ratio of the alkylphosphonic acid radical to the carboxylic acid radical is in the range from 1:2 to 1:4, derivatives thereof and mixtures thereof, said suspension having a viscosity of less than or equal to 1,500 mPa·s after at least 2 weeks of storage.

2. The aqueous calco-magnesian suspension according to claim 1, wherein said phosphonate or phosphonic acid comprises, in acid form, from 2 to 8 phosphonic acid characteristic groups.

3. The aqueous calco-magnesian suspension according to claim 1, wherein said phosphonate or phosphonic acid is selected from the group consisting of aminotris(methylenephosphonic) acid (ATMP), of 1-hydroxyethylidene-1,1-diphosphonic acid (HEDP), of ethylenediamine tetrakis(m-ethylenephosphonic) acid (EDTMP), of hexamethylenediamine tetrakis(methylenephosphonic) acid (HDTMP), of diethylenetriamine pentakis(methylenephosphonic) acid (DTPMP), of (2-hydroxy)ethylamino-N,N-bis (methylenephosphonic) acid (HEMPA), of 2-phosphono-1, 2,4-butanetricarboxylic acid (PBTC), of 6-amino-1-hydroxyhexylene-N,N-diphosphonic acid (neridronic acid), of N,N'-bis(3-aminopropyl)ethylenediamine hexakis(methylenephosphonic) acid, of bis(hexamethylenetriamine) pentakis(methylenephosphonic) acid, of aminotris(methylenephosphonic) acid oxide, derivatives thereof and mixtures thereof.

4. The aqueous calco-magnesian suspension according to claim 1, wherein said phosphonate or phosphonic acid is present at an active acid content greater than or equal to 0.05% by weight, based on the total weight of said solid particles.

5. The aqueous calco-magnesian suspension according to claim 1, wherein said phosphonate or phosphonic acid is present at an active acid content of less than or equal to 5% by weight, based on the total weight of said solid particles.

6. The aqueous calco-magnesian suspension according to claim 1, wherein the concentration of said solid particles in the aqueous phase is greater than or equal to 300 g/kg.

7. The aqueous calco-magnesian suspension according to claim 1, wherein said solid particles are slaked lime particles wherein a is greater than or equal to 92% by weight.

8. The aqueous calco-magnesian suspension according to claim 1, wherein said solid particles have a specific surface area calculated according to the BET method comprised between 4 and 25 m²/g.

9. The aqueous calco-magnesian suspension according to claim 1, wherein said solid particles have a $d_{50}$ measured by laser granulometry comprised between 1 and 20 μm.

10. The aqueous calco-magnesian suspension according to claim 1, having a viscosity of less than or equal to 1,200 mPa·s after at least 2 weeks of storage.

11. A method for making an aqueous calco-magnesian suspension comprising formation of a suspension of solid particles fitting the general formula a Ca(OH)$_2$.b Mg(OH)$_2$.c MgO.d I wherein a, b and c are mass fractions the sum of which has a value from 90 to 100%, and a is greater than or equal to 90% by weight, the sum of b and c is higher than 0, and d has a value from 0 to 10% as a mass fraction, I representing impurities in a first aqueous phase, at a concentration greater than or equal to 200 g/kg of solid particles based on the weight of the suspension and addition of an additive which is simultaneously a viscosity reducer and a viscosity increase moderator, said additive being a phosphonate or phosphonic acid selected from the group consisting of aminoalkylene polyphosphonic acids, wherein the alkylene radical contains from 1 to 20 carbon atoms, of hydroxyalkylidene polyphosphonic acids, wherein the alkylidene radical contains from 2 to 50 carbon atoms, phosphonoalkanepolycarboxylic acids, wherein the alkane group contains from 3 to 12 carbon atoms and wherein the molar ratio of the alkylphosphonic acid radical to the carboxylic acid radical is in the range from 1:2 to 1:4, derivatives thereof and mixtures thereof, said additive being added in a quantity sufficient to obtain a suspension having a viscosity of less than or equal to 1,500 mPa·s after at least two weeks of storage.

12. The method for making an aqueous calco-magnesian suspension according to claim 11, wherein said step for forming the suspension of solid particles comprises mixing solid particles fitting the general formula a Ca(OH)$_2$.b Mg(OH)$_2$.c MgO.d I wherein a, b and c are mass fractions, the sum of which has a value from 90 to 100% and a is greater than or equal to 90% by weight, the sum of b and c is higher than 0, and d has a value from 0 to 10% as a mass fraction, I representing impurities, with said first aqueous phase.

13. The method for making an aqueous calco-magnesian suspension according to claim 11, wherein said step for forming the suspension of solid particles comprises a step for slaking quick lime or dolomitic lime with said first aqueous phase with the obtaining of the aqueous calco-magnesian suspension of solid particles fitting the general formula a Ca(OH)$_2$.b Mg(OH)$_2$.c MgO.d I, wherein a, b and c are mass fractions, the sum of which has a value from 90 to 100% and a is greater than or equal to 90% by weight, the sum of b and c is higher than 0, and d has a value from 0 to 10% as a mass fraction, I representing impurities.

14. The method for making an aqueous calco-magnesian suspension according to claim 11, wherein said step for forming the suspension of solid particles comprises a step for diluting a concentrated suspension of said solid particles or a concentrated slurry of said solid particles with said first aqueous phase.

15. The method according to claim 11, wherein said addition of said phosphonate or phosphonic acid occurs in said first aqueous phase, before, during or after the formation of said suspension of solid particles.

16. The method according to claim 11, wherein said phosphonate or phosphonic acid is added to quick lime or dolomitic lime, to solid particles fitting the general formula a Ca(OH)$_2$.b Mg(OH)$_2$.c MgO.d I, wherein a, b and c are mass fractions, the sum of which has a value from 90 to 100% and a is greater than or equal to 90% by weight, the sum of b and c is higher than 0, and d has a value from 0 to 10% as a mass fraction, I representing impurities, or further to said concentrated suspension or concentrated slurry of said solid particles.

17. The method according to claim 11, wherein the pH of the first aqueous phase is adjusted prior to the addition of phosphonate or phosphoric acid, so as to guarantee total solubility of said phosphonate or phosphonic acid.

18. The method according to claim 11, wherein said phosphonate or phosphonic acid is added as a solution or suspension into a second aqueous phase.

19. The method according to claim 18, wherein the pH of the second aqueous phase is adjusted prior to the addition of phosphonate or phosphonic acid, so as to guarantee total solubility of the phosphonate or phosphonic acid.

20. The method according to claim 11, wherein said phosphonate is added as a solid, in the form of an acid or in the form of a salt.

21. The method according to claim 11, wherein said phosphonate or phosphonic acid comprises, in the form of an acid, from 2 to 8 phosphonic acid characteristic groups.

22. The method according to claim 11, wherein said phosphonate or phosphonic acid is selected from the group consisting of aminotris(methylenephosphonic) acid (ATMP), of 1-hydroxyethylidene-1,1-diphosphonic acid (HEDP), of ethylenediamine tetrakis(methylenephosphonic) acid (EDTMP), of hexamethylenediamine tetrakis(methylenephosphonic) acid (HDTMP), of diethylenetriamine pentakis(methylenephosphonic) acid (DTPMP), of (2-hydroxy)ethylamino-N,N-bis(methylenephosphonic) acid (HEMPA), of 2-phosphono-1,2,4-butanetricarboxylic acid (PBTC), of 6-amino-1-hydroxyhexylene-N,N-diphosphonic acid (neridronic acid), of N,N'-bis(3-aminopropyl)ethylenediamine hexakis(methylenephosphonic) acid, of bis(hexamethylenetriamine) pentakis(methylenephosphonic) acid, of aminotris(methylenephosphonic) acid oxide, derivatives thereof and mixtures thereof.

23. The method according to claim 11, wherein said phosphonate or phosphonic acid is added at an active acid content greater than or equal to 0.05% by weight, based on the total weight of said solid particles.

24. The method according to claim 11, wherein said phosphonate or phosphonic acid is present at an active acid content of less than or equal to 5% by weight, based on the total weight of said solid particles.

25. The method according to claim 11, wherein the concentration of the solid particles in the aqueous phase is greater than or equal to 300 g/kg.

* * * * *